J. W. YOUNG & J. P. GLASS.
Nail-Separators.

No. 154,111.    Patented Aug. 11, 1874.

Witnesses:
Harry C. Clark
M. Church

Inventors,
John W. Young
John P. Glass
by Hill & Ellsworth
Attys.

UNITED STATES PATENT OFFICE.

JOHN W. YOUNG AND JOHN P. GLASS, OF WHEELING, W. VA., ASSIGNORS OF ONE-HALF THEIR RIGHT TO ANDREW H. BAGGS, OF KIRKWOOD, OHIO, AND JOSEPH H. WOODWARD, OF WHEELING, W. VA.

IMPROVEMENT IN NAIL-SEPARATORS.

Specification forming part of Letters Patent No. 154,111, dated August 11, 1874; application filed July 21, 1874.

*To all whom it may concern:*

Be it known that we, JOHN W. YOUNG and JOHN P. GLASS, both of Wheeling, in the county of Ohio and State of West Virginia, have invented certain new and useful Improvements in Nail-Distributing Machines; and we do hereby the following to be a full and exact description thereof, reference being had to the accompanying drawings forming part of this specification, in which—

Figure 1:
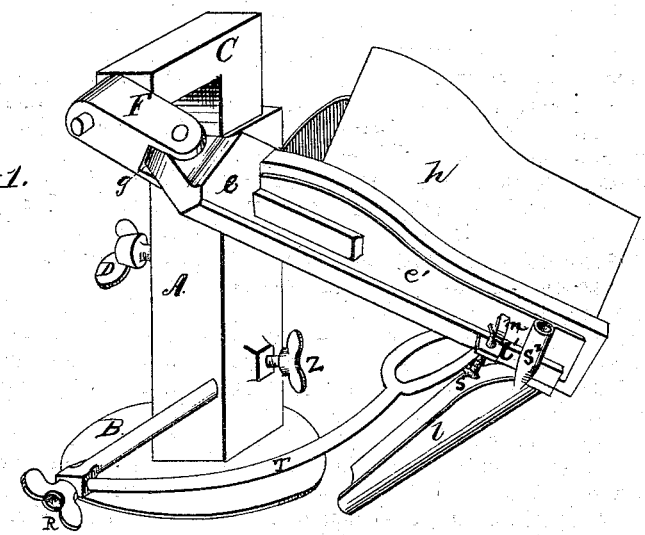
Figure 2:
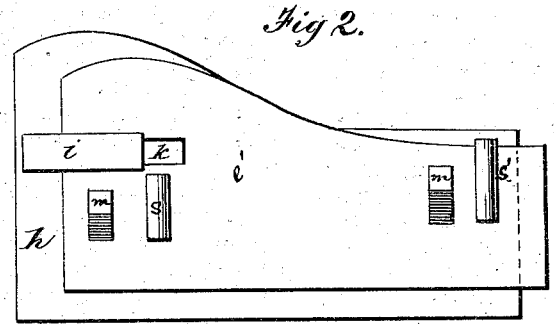
Figure 3:

Figure 1 is a perspective view of our invention with one of the sides of the chute removed. Fig. 2 is a bottom-plan view of one of the chute sides with the plate to which it is attached; and Fig. 3 is an end elevation of the same.

Similar letters of reference in the accompanying drawings denote the same parts.

In that class of nail-distributing machines in which an inclined vibrating chute is employed, provided with a slot in its bottom, through which the nails having no heads or imperfect ones pass, the nails having perfect heads being retained in the slot and carried to a separate receptacle, it is found that the inclined planes forming the side faces of the chute, and which are made of metal bolted to a frame, are extremely liable to become worn by the attrition of the nails against the sides of the chute, thus wearing away the latter, and forming scale and dirt, and clogging the machine, the friction, also, of the nails against the chute, and the bolt-heads constituting a serious defect in this class of machines.

The chutes heretofore in use being, as a general thing, of soft iron, the defects just named so common to them, may, of course, be largely remedied by the use of hardened iron, steel, franklinite, &c., but above all, by the use of glass instead of soft iron; and our present invention relates to a mode of combining glass with iron in a machine of this kind, and otherwise in particular combinations of parts, in virtue of which the device as a distributer and separator is greatly improved.

In the accompanying drawings, A is a hollow post, supported by a pedestal, B, in which is vertically adjusted an elbow, C, the height of which is regulated by a thumb-screw, D, to give the required elevation to the chute-frame e. On the outer end of the elbow c is attached the link F, which rotates thereon, and is provided with a slot, g, and pins, by means of which the link and chute-frame e are articulated, by which construction the elevation of the chute-frame may be varied at pleasure, and the hollow post, the pedestal of which is screwed to the floor, may be moved as near the dies for forming the nails as desired. h h are the inclined plates, made of glass, of sufficient thickness, which form the sides of the chute, into which the nails fall from the dies. The back surfaces of the chute sides are provided with beveled projecting pieces i i, cast or otherwise formed thereon, which are made to engage or slide into corresponding recesses k k, made in the metal plates e' of the chute.

It is obvious that a single projecting longitudinal piece may be cast or formed on the back face of each inclined face of the chute, which is made to slide in a corresponding groove or recess in the chute-plates, in lieu of the short projecting pieces above described, without departing from the spirit of my invention, the object of which is to connect the inclined planes forming the chute to its frame without having bolt-heads or other projecting parts on the interior faces of the inclined planes to obstruct the passage of the nails. The chute-frame e is provided with a trough, l, open at both ends, for the passage of the imperfect nails, and the sides of the chute are adjusted to vary the width of the slot between them by screws s s, passing through screw-threaded orifices in the lugs l' l' attached to the upper edges of the chute-frame e, and bearing against projections m m on the rear faces of the metallic plates e' e', the back faces of the latter being provided with thimbles or sleeves $s^1$ $s^1$, for the reception of rounded projections $s^2$ on the upper edges of the frame e, by means of which the V-shaped slot formed between the lower edges of the inclined planes h h, made of glass, may be enlarged or contracted to adapt the machine to nails of different sizes. The corners of lower edges of the inclined planes h h forming the chute, are beveled preferably, the slots, through which the nails pass being thus of a rounding V-shaped form. The upper edges of the inclined planes are also preferably curved upward toward the dies, so as to increase the cross-section of the planes nearest the dies, and the planes forming the chute may also be inclined inwardly toward each other, to arrest nails which would rebound in striking the chute, and direct them back into it.

The outer end of the chute-frame $e$ is supported by an arm, T, bifurcated at its outer end, the bifurcated parts abutting against projections or sockets on the lower face of the frame $e$. The opposite end of the arm T passes through an orifice in the rod B, in which it may be adjusted, and held in any position therein by the set-screw R. The rod B passes through the hollow post A, and can be adjusted therein as desired, and held in any desired position by the set-screw Z. By this construction the position of the chute-frame may be varied and adjusted as desired.

We claim as our invention—

1. The inclined faces $h\ h$, made entirely of glass, and attached by their rear faces to the adjustable plates $e'\ e'$, in combination with the chute-frame $e$, substantially as described, and for the purposes set forth.

2. The chute, provided with a V-shaped slot, inclined faces $h\ h$, made entirely of glass, in combination with the chute-frame, having recesses K K, link $f$, elbow $c$, and removable hollow post A, substantially as described, and for the purpose set forth.

JOHN W. YOUNG.
JOHN P. GLASS.

Witnesses:
THOS. LUNSFORD,
J. B. VANFOSSEN.